United States Patent
Mironets

(10) Patent No.: US 10,144,061 B2
(45) Date of Patent: Dec. 4, 2018

(54) PARTICULATES FOR ADDITIVE MANUFACTURING TECHNIQUES

(71) Applicant: Delavan Inc, West Des Moines, IA (US)

(72) Inventor: Sergey Mironets, Charlotte, NC (US)

(73) Assignee: Delavan Inc., West Des Moines, IA (US)

( * ) Notice: Subject to any disclaimer, the term of this patent is extended or adjusted under 35 U.S.C. 154(b) by 816 days.

(21) Appl. No.: 14/585,504

(22) Filed: Dec. 30, 2014

(65) Prior Publication Data

US 2016/0184891 A1    Jun. 30, 2016

(51) Int. Cl.
*B22F 1/00*     (2006.01)
*B29B 9/08*     (2006.01)
(Continued)

(52) U.S. Cl.
CPC .......... *B22F 1/0096* (2013.01); *B22F 3/1055* (2013.01); *B23K 15/0086* (2013.01); *B23K 15/0093* (2013.01); *B23K 26/0006* (2013.01); *B23K 26/342* (2015.10); *B28B 1/001* (2013.01); *B29B 13/021* (2013.01); *B29C 64/153* (2017.08); *B33Y 10/00* (2014.12); *B33Y 70/00* (2014.12); *B22F 2998/10* (2013.01); *B23K 2203/04* (2013.01); *B23K 2203/05* (2015.10); *B23K 2203/08* (2013.01); (Continued)

(58) Field of Classification Search
CPC .... B22F 1/0096; B22F 1/0059; B22F 3/1055; B22F 3/16; B22F 2998/10; B23K 15/0086; B23K 15/0093; B23K 2203/04; B23K 2203/05; B23K 2203/08; B23K 2203/10; B23K 2203/14; B23K 2203/26; B23K 2203/30; B23K 2203/42; B23K 2203/52; B28B 1/001; B29B 13/021; B29B 9/08; B29C 64/153; B33Y 10/00; B33Y 70/00; Y02P 10/295
See application file for complete search history.

(56) References Cited

U.S. PATENT DOCUMENTS

| 3,397,057 A | 8/1968 | Harrington et al. |
| 2008/0152910 A1 | 6/2008 | Hesse et al. |

(Continued)

FOREIGN PATENT DOCUMENTS

| CA | 1248292 A | 1/1989 |
| CN | 103785860 A | 5/2014 |

(Continued)

OTHER PUBLICATIONS

EPO Official Examiner's Letter dated Jul. 18, 2017 from the European Patent Office for Application No. 15 201 860.2.

(Continued)

*Primary Examiner* — Christopher S Kessler
*Assistant Examiner* — Anthony M Liang
(74) *Attorney, Agent, or Firm* — Locke Lord LLP; Daniel J. Fiorello; Scott D. Wofsy

(57) ABSTRACT

A globule for an additive manufacturing process includes a plurality of additive manufacturing stock particles respectively having a submicron size. A binder fixes the plurality of submicron size additive manufacturing stock particles to one another such that the particles form a globule having a size of less than fifty microns.

8 Claims, 5 Drawing Sheets

(51) Int. Cl.

| | | |
|---|---|---|
| *B22F 3/105* | (2006.01) | |
| *B23K 15/00* | (2006.01) | |
| *B23K 26/342* | (2014.01) | |
| *B23K 26/00* | (2014.01) | |
| *B28B 1/00* | (2006.01) | |
| *B33Y 10/00* | (2015.01) | |
| *B33Y 70/00* | (2015.01) | |
| *B29B 13/02* | (2006.01) | |
| *B29C 64/153* | (2017.01) | |
| *B23K 103/04* | (2006.01) | |
| *B23K 103/10* | (2006.01) | |
| *B23K 103/14* | (2006.01) | |
| *B23K 103/08* | (2006.01) | |
| *B23K 103/00* | (2006.01) | |
| *B23K 103/18* | (2006.01) | |

(52) U.S. Cl.
CPC ...... *B23K 2203/10* (2013.01); *B23K 2203/14* (2013.01); *B23K 2203/26* (2015.10); *B23K 2203/30* (2015.10); *B23K 2203/42* (2015.10); *B23K 2203/52* (2015.10); *B29B 9/08* (2013.01); *Y02P 10/295* (2015.11)

(56) References Cited

U.S. PATENT DOCUMENTS

| | | |
|---|---|---|
| 2012/0164322 A1 | 6/2012 | Teulet |
| 2014/0196360 A1 | 7/2014 | Sarkar |
| 2014/0252685 A1 | 9/2014 | Stucker et al. |
| 2017/0008082 A1* | 1/2017 | Chen ............... B22F 9/082 |

FOREIGN PATENT DOCUMENTS

| | | |
|---|---|---|
| EP | 2208558 A1 | 7/2010 |
| WO | WO-0058389 A1 | 10/2000 |
| WO | WO-03039790 A2 | 5/2003 |
| WO | WO-2014049159 A1 | 4/2014 |

OTHER PUBLICATIONS

Reinhold Robert Melcher et al: "Rapid prototyping von Keramiken durch 3D-Drucken", Jul. 14, 2009 (Jul. 14, 2009), XP055300353, Retrieved from the Internet: URL:https://www.tib.eu/de/suchen/id/TIBKAT%3A609681206/Rapid-Prototyping-von-Keramiken-durch-3D-Drucken/[retrieved on Sep. 6, 206] p. 18.

European Search Report from the European Patent Office dated Sep. 15, 2016 for Application No. EP15201860.

Partial Search Report dated Jun. 15, 2016 in connection with EP Application No. EP15201860.2.

G. Mehos, et al.: "Consider Wet Agglomeration to Improve Powder Flow," Chemical Engineering, www.chem.com, Jan. 2011, pp. 46-49.

Anonymous: "Spray agglomeration—fluidized bed spray agglomeration," Glatt Integrated Process Solutions, http://www.glatt.com/en/processes/granulatin/spray-agglomeration, retrieved Jul. 19, 2016.

St. H. Irsen et al.: "Bioceramic Granulates for Use in 3D Printing: Process Engineering Aspects," Mat.-wiss, Wekstofftech, 2006, 37, No. 6, pp. 533-537.

* cited by examiner

PARTICULATES FOR ADDITIVE MANUFACTURING TECHNIQUES

BACKGROUND OF THE INVENTION

1. Field of the Invention

The present disclosure relates to additive manufacturing, and more particularly to particulates for additive manufacturing techniques.

2. Description of Related Art

Additive manufacturing refers to a category of manufacturing methods that create structures layer-wise, typically by successively adding thin sheets of material to underlying material. Examples of additive manufacturing include stereo lithography processes, laser object manufacturing, and electron beam or laser melting techniques. Stereo lithography processes involve chemically changing photosensitive material disposed within a liquid, generally applying light to the material. Laser object manufacturing processes typically involve cutting and joining thin sheets of material to define a structure, typically using a focused beam of energy generated by a laser. Electron beam melting and laser additive manufacturing processes commonly include defining structure geometry by selectively applying electron beam or laser light to particulate material for defining the geometry of a structure. In the process of defining the geometry of a structure, stereo lithography, laser object manufacturing, electron beam, and laser melting techniques can also define artifacts on or within the surface of the structure. Such artifacts can influence the physical properties of the structure, such as the expected fatigue life of the structure.

Such conventional methods and systems have generally been considered satisfactory for their intended purpose. However, there is still a need in the art for improved systems and methods for additively manufacturing structures with improved control over structure surface artifacts. The present disclosure provides a solution for this need.

SUMMARY OF THE INVENTION

A globule for an additive manufacturing process includes a plurality of additive manufacturing stock particles having a submicron size. A binder fixes the plurality of submicron size additive manufacturing stock particles to one another such that the particles form a globule having a size of less than fifty microns.

In certain embodiments the binder can fix the plurality of additive manufacturing stock particles to one another within an encapsulating droplet. The binder can define a capillary bond, a pendular bond, or funicular bond fixing one of the plurality of additive manufacturing stock particles to another of the plurality of additive manufacturing stock particles. It is also contemplated that the binder can include material from one of plurality of additive manufacturing stock particles to another of the plurality of additive manufacturing stock particles.

In accordance with certain embodiments the binder can include water. The plurality of additive manufacturing stock particles can includes at least one of a metallic material, a ceramic material, and a polymeric material. The plurality of additive manufacturing stock particles can include nanoparticles. The globules can include globules with a globule size smaller than five microns.

A method of making globules for an additive manufacturing process includes introducing a plurality of additive manufacturing stock particles of submicron size into a spray chamber and wetting surfaces of the plurality of additive manufacturing stock particles into with a binder. The method also includes agglomerating the plurality of manufacturing stock particles into globules having globules sizes smaller than ten microns.

In embodiments, the method also includes spraying the binder into the spray chamber such that a flow of additive manufacturing stock particles intersects a flow of the binder material. The method can also include strengthening the globules by heating the globules, such as by using a pre-sintering process. Heating the globules can include completely evaporating the binder material from the globules.

A method of manufacturing globules for an additive manufacturing process includes depositing a plurality of globules as described above into a development module of a power bed fusing system. The method also includes compressing the plurality of globules within the development module and selectively applying thermal energy to the plurality of globules. The thermal energy is applied using a directed energy system, such as an electron beam or laser system.

In embodiments the method also includes fusing a portion of the plurality of globules into an integral structure and retracting the structure into the development module. The method further includes depositing a second plurality of the globules into the development module, compressing the additional globules into the development module, and selectively applying additional thermal energy to at least a portion of the additional globules using the directed energy system such that the portion of the additional globules fuse to the integral structure. Compressing the plurality of globules within the development module can also include spreading and compressing the globules using a roller re-coater.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
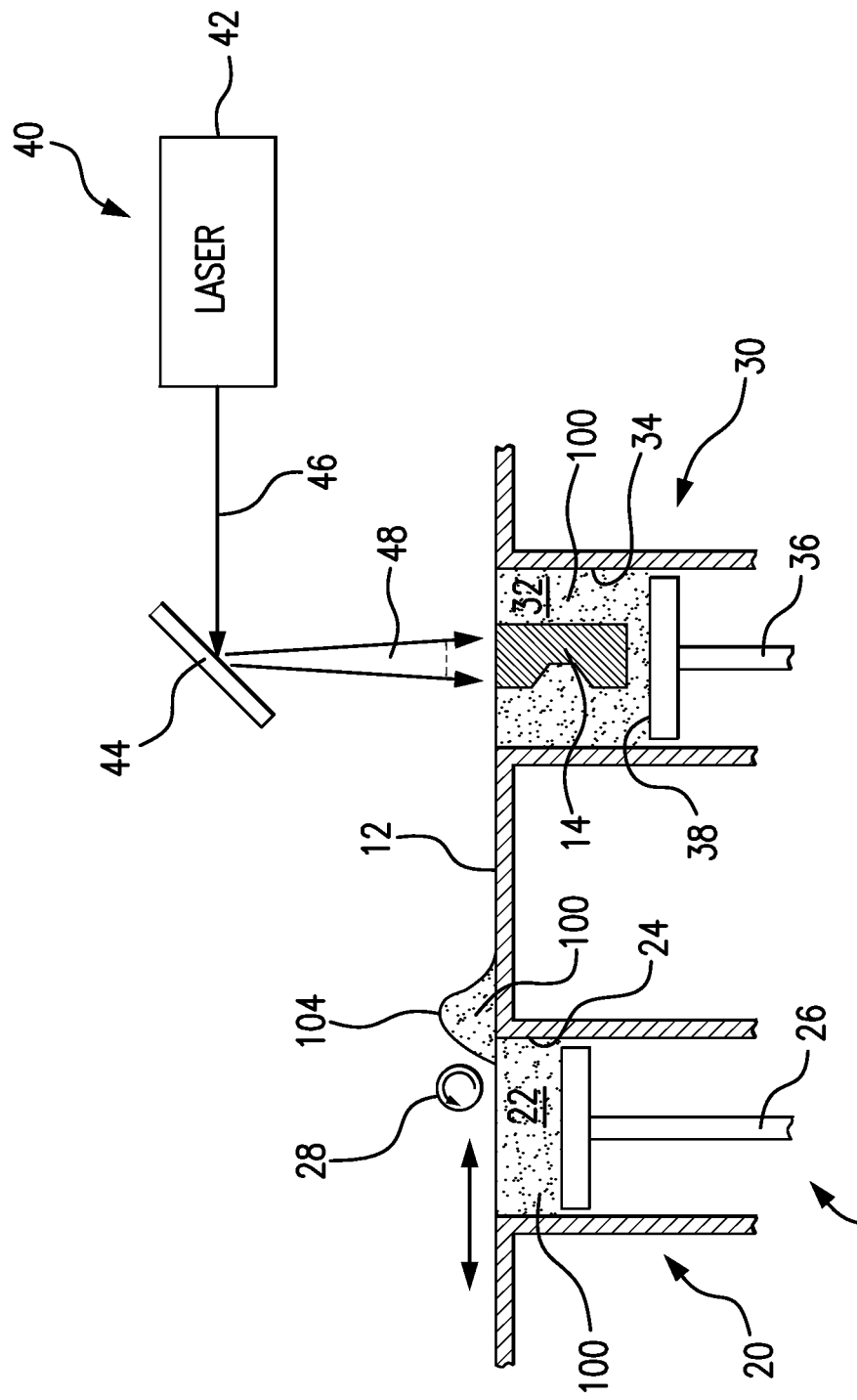
FIG. 1 is schematic side view of a powder bed manufacturing system, showing modules of the system utilizing additive manufacturing stock particles disposed in globules.

Reference will now be made to the drawings wherein like reference numerals identify similar structural features or aspects of the subject disclosure. For purposes of explanation and illustration, and not limitation, a powder be fusing system using globules of additive manufacturing stock according to an exemplary embodiment in accordance with the disclosure is shown in FIG. 1 and is designated generally by reference character 10. Other embodiments in accordance with the disclosure, or aspects thereof, are provided in FIGS. 2-9, as will be described. The systems and methods described herein can be used in additive manufacturing processes, such as for fuel injectors for gas turbine engines.

Powder bed fusing system 10 includes charging module 20, a development module 30, and a fusing module 40. A transfer surface 12 connects charging module 20 with development module 30. Fusing module 40 is optically coupled to development module 30 and is configured for cooperation with both charging module 20 and development module 30 for forming a structure 14. Structure 14 is formed by selectively fusing successive layers of additive manufacturing stock particulate 102 (shown in FIG. 2) fixed to one another within globules 100. It is to be understood and appreciated that powder bed fusing system 10 is a non-limiting example of system advantaged through the use of globules 100, and that other non-limiting examples of systems similarly advantaged by the present disclosure include direct laser sintering systems, direct laser melting systems, selective laser sintering systems, selective laser melting systems, and electron beam melting systems.

Charging module 20 includes a reservoir 22 with walls 24, a piston 26, and a roller 28. Walls 24 and piston 26 bound reservoir 22, an upper surface of piston 26 forming a movable floor of reservoir 22. Roller 28 operatively associated with powder bed fusing system 10 and configured and adapted for laterally traversing the top of reservoir 22 and transfer surface 12. Globules 100 including additive manufacturing stock particles 102 (shown in FIG. 2) are disposed within reservoir 22 such that upward (relative to the top of FIG. 1) movement of piston 26 displaces a globule charge 104 from within reservoir 22 to a movement envelope (shown with a double-ended arrow) of roller 28. Lateral, i.e. right-hand direction relative to FIG. 1 movement of roller 28 drives globule charge 104 laterally and into development module 30.

Development module 30 includes a build chamber 32 with walls 34 and a piston 36. Walls 34 and piston 36 bound build chamber 32, an upper support surface 38 of piston 36 supporting an additively manufactured structure 14. As successive layers are fused to the upper surface of additively manufactured structure 14, piston 36 withdraws (i.e. downward relative to FIG. 1) into build chamber 32. This forms a depression (not shown for clarity purposes) in the upper portion of build chamber 32 that is levelled by globule charge 104 displaced by lateral movement of roller 28.

Fusing module 40 includes an electron or laser system 42 and a beam steering element 44. Beam steering element 44 optically couples electron or laser system 42 such that a fixed beam 46 generated by electron or laser system 42 is directed over a predetermined variable path 48 over a surface of build chamber 32. This fuses portion of the additive manufacturing stock particles 102 (shown in FIG. 2) to underlying structure 14, thereby adding a layer to structure 14. In this respect iterations of successive retractions of piston 36, lateral movements of roller 28, and advancements of piston 26 and intervening operation of electron or laser system 42 progressively develop structure 14.

One challenge to structures produced using conventional additive manufacturing stock particulate using powder bed fusion systems is surface roughness. Surface roughness can affect the mechanical properties of the structures, such as by fatigue properties, and such structures can therefore require machining subsequent to the above-described layer-wise construction process to improve the surface characteristics of the structure. In some instances, such as in structures having internal passages with complex geometries defined within the structure, it can be prohibitively difficult to suitably improve surface finish using hydro-honing or abrasive flow machining.

Figure 2:
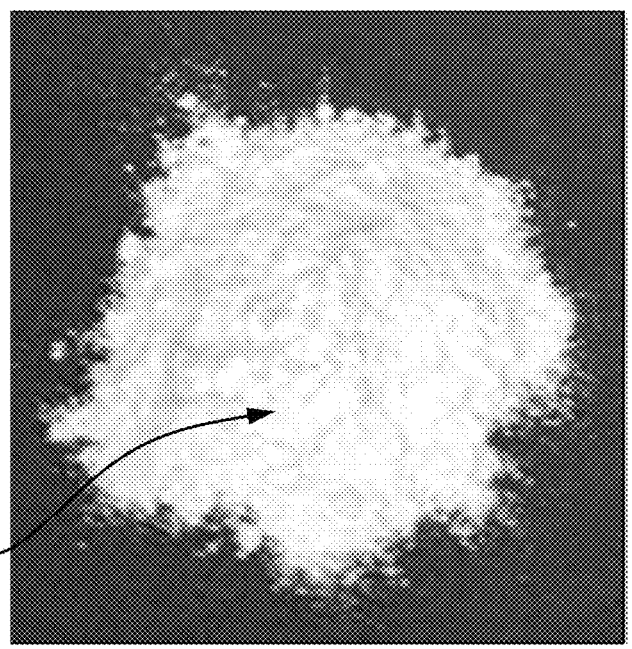
FIG. 2 shows additive manufacturing stock particles having submicron size.

With reference to FIG. 2, additive manufacturing stock particles 102 are shown. Applicants have determined that the size and distribution of the additive manufacturing stock particles 102 influences surface roughness of the resulting structure. As powder size becomes progressively finer, surface roughness improves. For example, stock particles sized at about 40 microns typically provide a surface roughness (arithmetic mean) of about 10 microns. Stock particles sized at around 5 microns can provide a surface roughness (arithmetic mean) of about 5 microns. Accordingly, use of additive manufacturing stock particles 102 can reduce the surface roughness of structures formed using the particles. In embodiments, additive manufacturing stock particles 102 including submicron size particles, i.e. have particle size of less than 1 micron. In certain embodiments, additive manufacturing stock particles 102 include nanoparticles, i.e. have particle size of less than 100 nanometers or any other suitable particle size.

Additive manufacturing stock particles 102 can be of uniform or of diverse constitution. In embodiments, additive manufacturing stock particles 102 include a metallic material such as nickel, cobalt, titanium, or aluminum-based alloys, stainless steels, high strength steels or any other suitable material. In certain embodiments, additive manufacturing stock particles 102 include a ceramic material such as $Al_2O_3$, $Si_3N_4$, SiC, $ZrO_2$, BN, or any other suitable material. It is also contemplated that additive manufacturing stock particles 102 can include polyethylene, water-soluble polymers, and starch-based binders for example. As additive manufacturing stock particles 102 become smaller they more readily tend to become airborne. This can present operational issues to machinery handling the particles. It can also pose a hazard to personnel operating the machinery and/or require specialized handling equipment for such systems.

Figure 3:
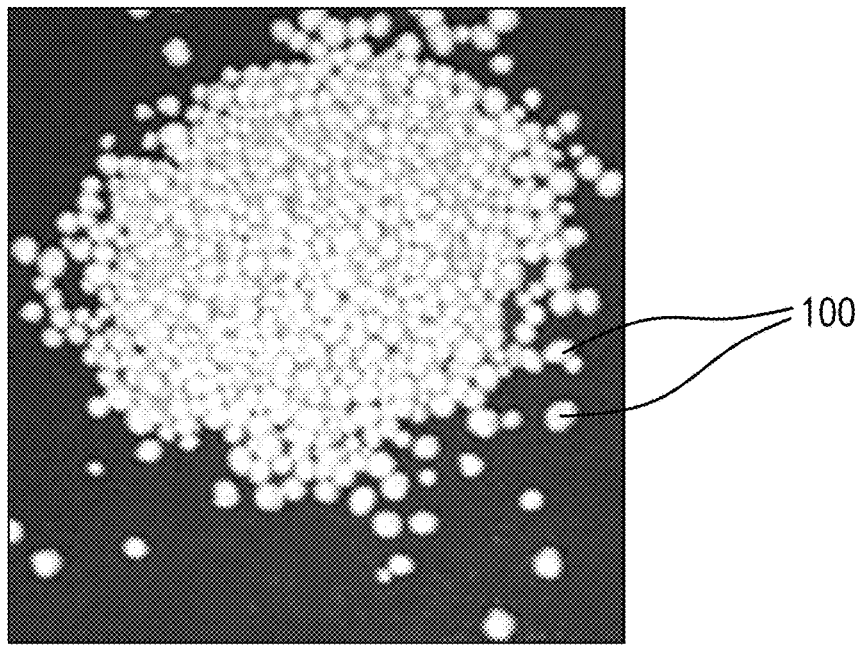
FIG. 3 shows the additive manufacturing stock particles of FIG. 2 fixed into globules.

With reference to FIG. 3, globules 100 for an additive manufacturing process are shown. Globules 100 include a plurality of additive manufacturing stock particles 102 (shown in FIG. 2) having a submicron size. A binder 106 fixes additive manufacturing stock particles 102 together such that additive manufacturing stock particles 102 form globules 100 having a size of less than 10 microns and greater than 1 micron. Binder 106 fixes additive manufacturing stock particles one another by applying external forces on the particles.

Figure 4:
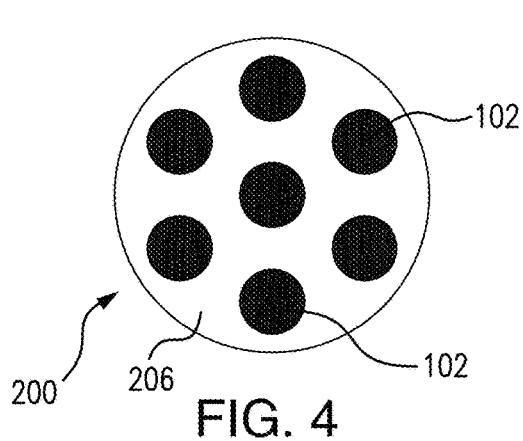
FIG. 4 is a schematic view of an embodiment of a globule including a plurality of particles as illustrated in FIG. 1, showing a binder encapsulating the particles.
Figure 5:
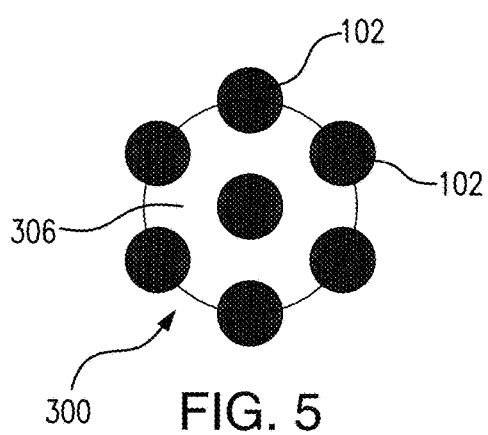
FIG. 5 is a schematic view of an embodiment of a globule including a plurality of particles as illustrated in FIG. 1, showing a binder fixing particles with a capillary bond.
Figure 6:
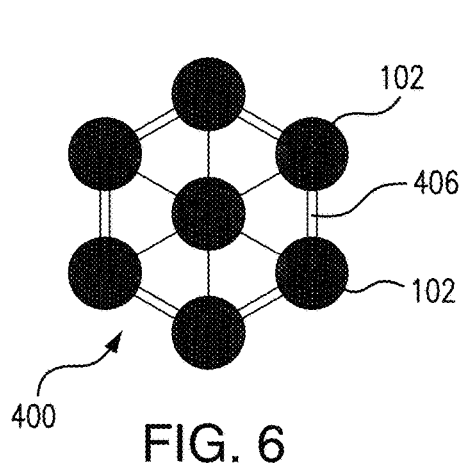
FIG. 6 is a schematic view of an embodiment of a globule including a plurality of particles as illustrated in FIG. 1, showing a binder fixing particles with a pendular bond.
Figure 7:
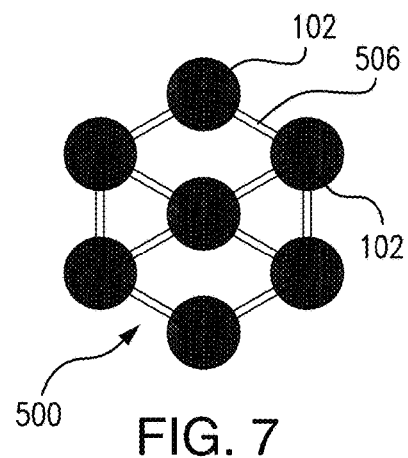
FIG. 7 is a schematic view of an embodiment of a globule including a plurality of particles as illustrated in FIG. 1, showing a binder fixing particles with a funicular bond.
Figure 8:
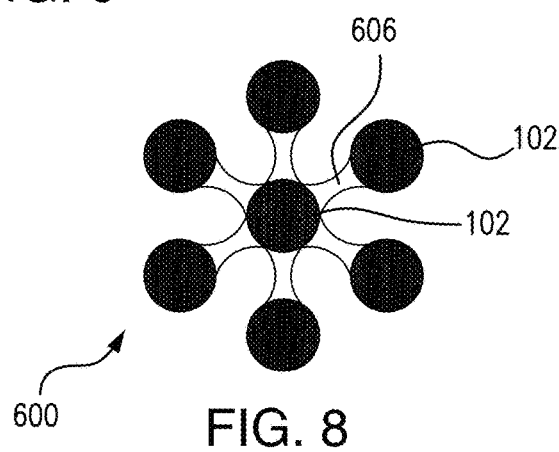
FIG. 8 is a schematic view of an embodiment of a globule including a plurality of particles as illustrated in FIG. 1, showing a particles fixed by diffused particle material.

With reference to FIGS. 4-8, different embodiments of globules including a binder are shown. In embodiments, the globules have a size that prevents them from becoming airborne within powder bed fusion system 10 (shown in FIG. 1). The globule size can be about 50 microns (0.002 inches) or smaller. In certain embodiments, the binder is a liquid such as water. In FIG. 4, a globule 200 is shown including an encapsulating binder 206 that fixes and encapsulates additive manufacturing stock particles 102 together into globule 200. In FIG. 5, a globule 300 is shown including a binder 306 that exerts capillary bonds on additive manufacturing stock particles 102 bonds, thereby agglomerating each into globule 300. In FIG. 6, a globule 400 is shown including a binder 406 that exerts funicular bonds on additive manufacturing stock particles 102 bonds, thereby agglomerating each into globule 400. In FIG. 7, a globule 500 is shown including a binder 506 that exerts pendular bonds on additive manufacturing stock particles 102 bonds, thereby agglomerating each into globule 500. In FIG. 8, a globule 600 is shown including a binder 606. Binder 606 is a diffusion bond formed by material from one additive manufacturing stock particle 102 diffusing across at least across a portion of the surface of another of the additive manufacturing stock particles 102, thereby agglomerating each into globule 600. As will appreciated, FIGS. 4-8 can be considered a continuum of globule dryness, the degree of 'dryness' correlating with the size of the associated globule.

Figure 9:
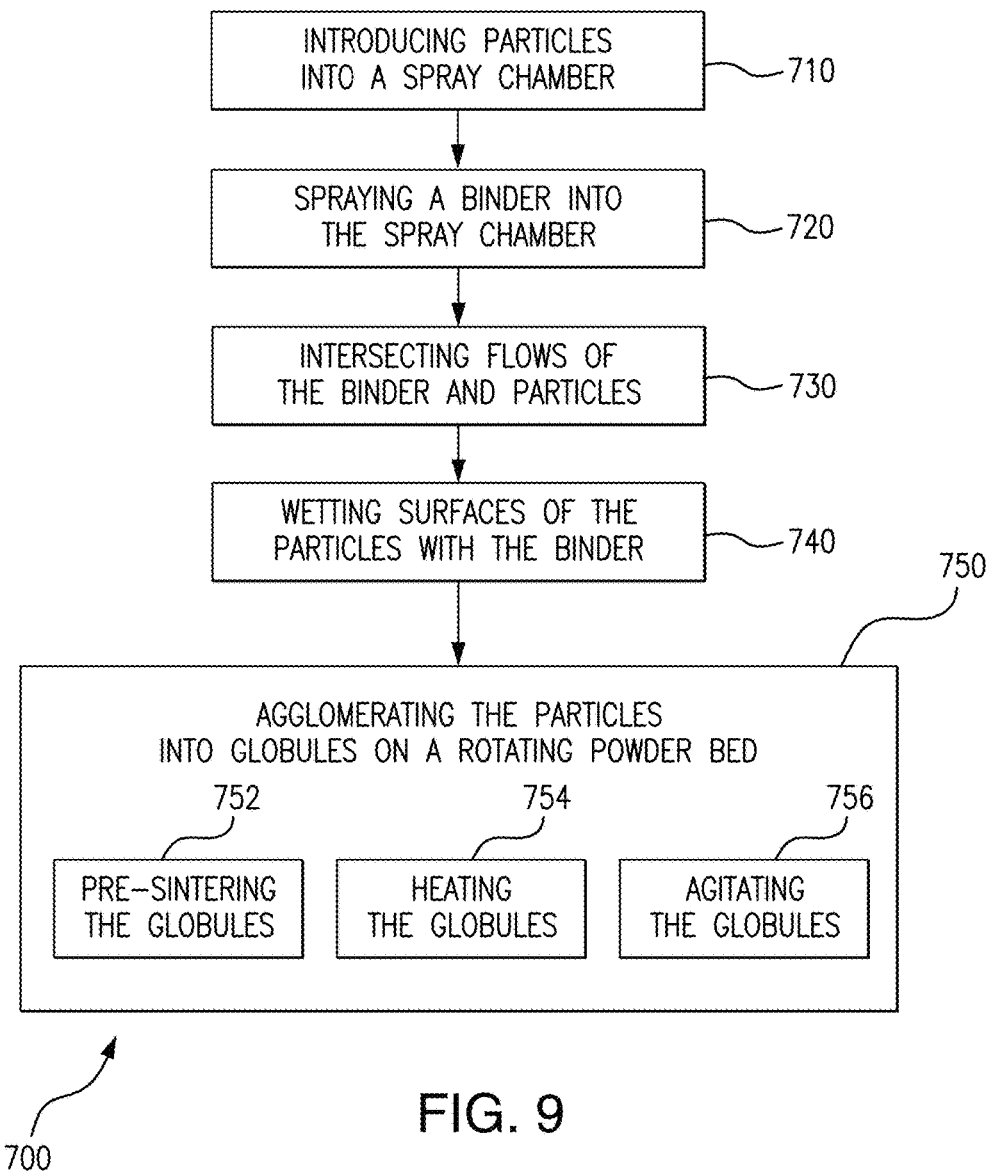
FIG. 9 shows a method for making the globules using the particles of FIG. 2.

With reference to FIG. 9, a method 700 of making globules, e.g. globules 100, is shown. Method 700 generally includes partially wetting additive manufacturing stock particles, e.g. additive manufacturing stock particles 102, in a spray chamber, rotating the particles on a rotating powder bed to partially dry the powder, and controlling the size of globules formed as the moist particulates agglomerate on the rotating powder bed. In this respect method 700 may include introducing a plurality of additive manufacturing stock particles of submicron size into a spray chamber, as illustrated with box 710. Method 700 may also include wetting surfaces of the plurality of additive manufacturing stock particles into with a binder, e.g. binder 106, as illustrated with box 740. Method 700 may additionally include agglomerating manufacturing stock particles into globules having globules sizes smaller than fifty microns, as illustrated with box 750.

Method 700 can also include spraying the binder into the spray chamber, as shown with box 710. Method 700 can further include intersection a flow of particulate with a flow of binder, as shown with box 730. Agglomerating the particles into globules can include tumbling or growth agglomeration, heat agglomeration, and/or pressure agglomeration. Agglomerating the particles into globules can also include one of more of agitating the globules (with or without additives), heating the globules, and/or pre-sintering the globules, as shown by boxes 752, 754, and 756. As will be appreciated by those skilled in the art in view of the present disclosure, heating (or pre-sintering) the globules can include removing some or all of the binder. In embodiments this can include completely drying the globules. Pre-sintering the globules can include diffusing material from one particle to at least the surface of another of the particles, thereby forming globules of controlled size that exhibit characteristics of submicron particles for purposes of additive manufacturing techniques and which exhibit characteristics of large particles (e.g. fifty microns and larger) in terms of handling. Pre-sintering can both increase the mechanical strength of the globules as well as to completely evaporate the binder material. Controlled enlargement of the globules to a pre-determined globule size in turn improve the globule properties of the intended additive manufacturing technique.

In embodiments, the method also includes spraying the binder into the spray chamber such that a flow of additive manufacturing stock particles intersects a flow of the binder material. The method can also include strengthening the globules by heating the globules, such as by using a pre-sintering process. Heating the globules can include completely evaporating the binder material from the globules.

Figure 10:
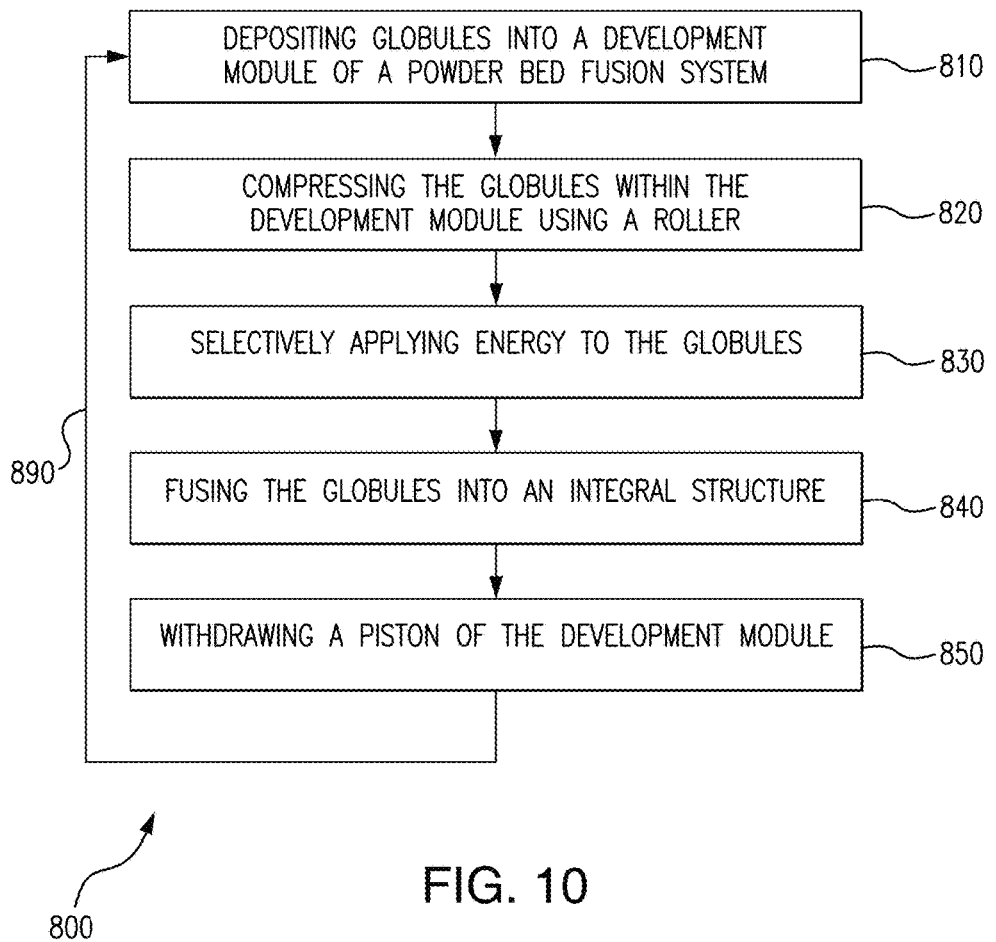
FIG. 10 shows a method of making a structure using additive manufacturing stock particle globules, according to an embodiment.

With reference to FIG. 10, an additive manufacturing method 800 is shown. Method 800 may include depositing a plurality of globules as described above into a development module of a power bed fusing system, e.g. development module 30 of powder bed fusion system 10, as shown with box 810. Method 800 may also include compressing the plurality of globules within the development module and selectively applying thermal energy to the plurality of globules as shown with box 830. The thermal energy can be applied using a directed energy system, e.g. electron beam or laser system 42.

Method can further include fusing a portion of the plurality of globules into an integral structure, e.g. structure 14, and retracting the structure into the development module as shown with box 840. Method 800 can additionally include depositing additional globules into the development module as shown with box 810, compressing the additional globules into the development module as shown with box 820, and selectively applying additional thermal energy to at least a portion of the additional globules using the directed energy system as indicated with box 830, fusing the additional globules into to the integral structure as indicated with box 840, and withdrawing the development module piston as indicated with box 850, iteratively, as indicated by arrow 890. Compressing the plurality of globules within the development module can also include spreading and compressing the globules using a roller re-coater, e.g. roller 28, as shown with box 820.

The use of globules with a roller re-coater capable of compressing the globules can provide several advantages. As the roller re-coater spreads the globules across the development module, the roller re-coater compresses the globules. This increases the powder packing number of the globules. Increasing the powder packing number improves bonding of the globule particles during the fusion process, providing more stable keyhole formation and/or inter-particle thermal conduction for example.

The methods and systems of the present disclosure, as described above and shown in the drawings, provide for additive manufacturing processes capable of producing structures with superior properties including improved surface finish and/or internal homogeneity. In embodiments, the above disclosure can provide improved as-built surfaces on structures fabricated using powder bed fusion processes. In certain embodiment, the above disclosure can accommodate diverse materials, including metals, ceramics, composites, as well as other materials. It can also use relatively fine, atomized particulates that would otherwise be unsuitable for conventional additive manufacturing techniques.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An additive manufacturing method, comprising:
   making pre-sintered globules for the additive manufacturing method, the method of making the pre-sintered globules comprising:
   introducing a plurality of additive manufacturing stock particles of submicron size into a spray chamber;
   wetting surfaces of the plurality of additive manufacturing stock particles with a binder by spraying the binder into the spray chamber and intersecting a flow of additive manufacturing stock particles with a flow of binder, wherein the binder material includes water;
   agglomerating the plurality of additive manufacturing stock particles into globules having sizes of less than 10 microns and greater than 1 micron; and
   strengthening the globules by pre-sintering the globules) wherein pre-sintering the globules includes completely evaporating the binder from the globules;
   depositing the plurality of pre-sintered globules into a development module of a powder bed fusing system;
   compressing the plurality of globules within the development module; and
   selectively applying thermal energy to the plurality of globules using an electron beam or laser system.

2. A method as recited in claim 1, further including:
   fusing a portion of the plurality of the globules into an integral structure; withdrawing a piston of the development module;
   depositing a second plurality of globules as recited in claim 1 into the development module;
   compressing the second plurality of globules into the development module; selectively applying thermal energy to a portion of the second plurality of globules using the electron beam or laser system; and
   fusing the portion of the second plurality of globules to form a layer of the integral structure.

3. A method as recited in claim 1, wherein compressing the plurality of globules within the development module includes spreading and compressing the globules using a roller.

4. A method as recited in claim 1, wherein the additive manufacturing stock particles include at least one of a metallic material, a ceramic material, and a polymeric material.

5. A method as recited in claim 1, wherein agglomerating the particles includes defining a plurality of pendular bonds fixing the plurality of additive manufacturing stock particles to one another.

6. A method as recited in claim 1, wherein agglomerating the particles includes defining a plurality of funicular bonds fixing the plurality of additive manufacturing stock particles to one another.

7. A method as recited in claim 1, wherein agglomerating the particles includes defining a plurality of capillary bonds fixing the plurality of additive manufacturing stock particles to one another.

8. A method as recited in claim 1, further comprising fixing the plurality of additive manufacturing stock particles to one another within an encapsulating droplet with the binder.

* * * * *